US010812941B2

(12) United States Patent
Liu et al.

(10) Patent No.: US 10,812,941 B2
(45) Date of Patent: Oct. 20, 2020

(54) POSITIONING METHOD AND DEVICE

(71) Applicant: Huawei Technologies Co., Ltd., Shenzhen (CN)

(72) Inventors: Yalin Liu, Shanghai (CN); Hui Li, Shenzhen (CN); Xiangjiang Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/519,890

(22) Filed: Jul. 23, 2019

(65) Prior Publication Data
US 2019/0349716 A1 Nov. 14, 2019

Related U.S. Application Data

(63) Continuation of application No. PCT/CN2017/106094, filed on Oct. 13, 2017.

(30) Foreign Application Priority Data

Jan. 24, 2017 (CN) .......................... 2017 1 0060298

(51) Int. Cl.
*H04W 4/029* (2018.01)
*H04N 7/18* (2006.01)
(52) U.S. Cl.
CPC ............ *H04W 4/029* (2018.02); *H04N 7/183* (2013.01)
(58) Field of Classification Search
CPC ......... H04W 4/029; H04W 4/40; H04W 4/08; H04W 4/02; H04W 64/00; H04W 4/023; H04W 64/006; H04N 7/183
See application file for complete search history.

(56) References Cited

U.S. PATENT DOCUMENTS 5,568,406 A * 10/1996 Gerber .................... B60R 13/10
116/63 R
8,744,644 B2 * 6/2014 Sung ................ G08G 1/096783
701/1
(Continued)

FOREIGN PATENT DOCUMENTS

CN 102628690 A 8/2012
CN 103141123 A 6/2013
(Continued)

OTHER PUBLICATIONS

Machine Translation and Abstract of Chinese Publication No. CN105809752, Jul. 27, 2016, 10 pages.
(Continued)

*Primary Examiner* — Marisol Figueroa
(74) *Attorney, Agent, or Firm* — Conley Rose, P.C.

(57) ABSTRACT

A positioning method and a device includes detecting, by a first device using a sensor, a target object that occurs within a range detectable to the sensor; and performing, by the first device in response to detecting any target object, each of determining relative location information of the first device relative to the target object according to a detection signal, determining absolute location information of the target object according to the relative location information and prestored absolute location information of the first device, and sending, using a wireless network, the absolute location information of the target object to a second device disposed on the target object.

20 Claims, 7 Drawing Sheets

(56) References Cited

U.S. PATENT DOCUMENTS

| | | | |
|---|---|---|---|
| 8,744,745 | B2 | 6/2014 | Pudar et al. |
| 9,344,989 | B2 | 5/2016 | Varoglu et al. |
| 2007/0106431 | A1* | 5/2007 | Tsuzuki ................. G08G 1/161 701/1 |
| 2011/0161032 | A1* | 6/2011 | Stahlin .................. G01C 21/30 702/94 |
| 2011/0217989 | A1 | 9/2011 | Fodor et al. |
| 2012/0196616 | A1 | 8/2012 | Edge |
| 2012/0284322 | A1 | 11/2012 | Laborczfalvi et al. |
| 2012/0310516 | A1* | 12/2012 | Zeng ....................... G01S 19/46 701/300 |
| 2014/0092236 | A1 | 4/2014 | Findeisen et al. |
| 2015/0025786 | A1* | 1/2015 | Hohm ..................... G06F 17/00 701/300 |
| 2016/0076914 | A1 | 3/2016 | Gotz |
| 2016/0265919 | A1 | 9/2016 | Schuller et al. |
| 2018/0068562 | A1* | 3/2018 | Ho .......................... G08G 1/163 |
| 2018/0173229 | A1* | 6/2018 | Huang .................... H04W 4/70 |

FOREIGN PATENT DOCUMENTS

| | | | |
|---|---|---|---|
| CN | 103389486 | A | 11/2013 |
| CN | 103548374 | A | 1/2014 |
| CN | 103869814 | A | 6/2014 |
| CN | 103941226 | A | 7/2014 |
| CN | 105424063 | A | 3/2016 |
| CN | 105637321 | A | 6/2016 |
| CN | 105809752 | A | 7/2016 |
| CN | 106332274 | A | 1/2017 |
| EP | 2902967 | A1 | 8/2015 |
| KR | 20120084244 | A | 7/2012 |

OTHER PUBLICATIONS

Foreign Communication From a Counterpart Application, Chinese Application No. 201710060298.9, Chinese Office Action dated Sep. 4, 2019, 9 pages.

Foreign Communication From a Counterpart Application, European Application No. 17894410.4, Extended European Search Report dated Oct. 28, 2019, 9 pages.

Machine Translation and Abstract of Chinese Publication No. CN102628690, Aug. 8, 2012, 13 pages.

Machine Translation and Abstract of Chinese Publication No. CN103389486, Nov. 13, 2013, 15 pages.

Machine Translation and Abstract of Chinese Publication No. CN103869814, Jun. 18, 2014, 28 pages.

Machine Translation and Abstract of Chinese Publication No. CN103941226, Jul. 23, 2014, 15 pages.

Machine Translation and Abstract of Chinese Publication No. CN106332274, Jan. 11, 2017, 25 pages.

Foreign Communication From a Counterpart Application, PCT Application No. PCT/CN2017/106094, English Translation of International Search Report dated Dec. 28, 2017, 2 pages.

Foreign Communication From a Counterpart Application, PCT Application No. PCT/CN2017/106094, English Translation of Written Opinion dated Dec. 28, 2017, 4 pages.

* cited by examiner

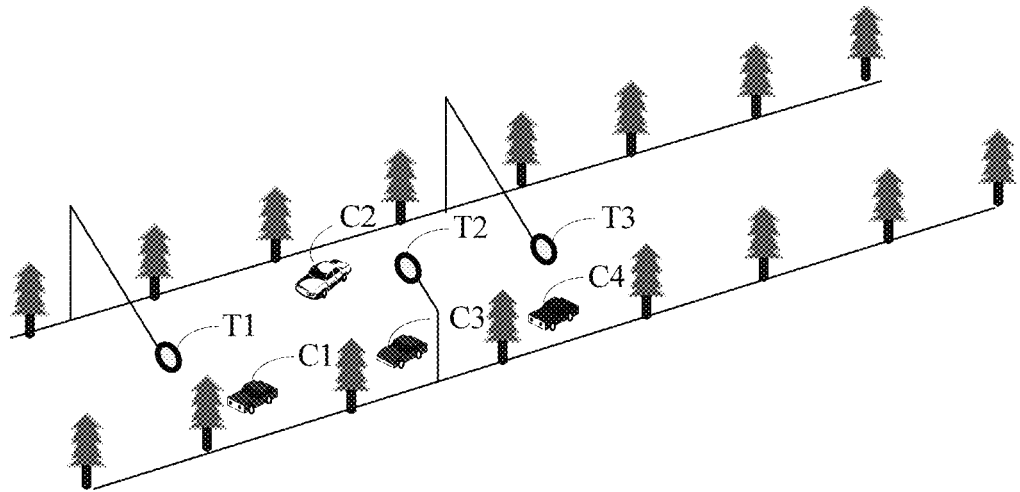

FIG. 2

| During motion of a moving target object, a communications device disposed on the moving target object detects, by using a sensor installed on the moving target object, an identifier of at least one fixed object occurring in a moving environment, and determines relative location information of the moving target object relative to the at least one fixed object by using the sensor | 300 |

| The communications device determines, from a preset correspondence between a fixed-object identifier and absolute location information according to the identifier of the at least one fixed object, absolute location information corresponding to the identifier of the at least one fixed object | 301 |

| The communications device estimates positioning information of the moving target object according to the absolute location information of the at least one fixed object and the relative location information of the moving target object relative to the at least one fixed object | 302 |

FIG. 3

POSITIONING METHOD AND DEVICE

CROSS-REFERENCE TO RELATED APPLICATIONS

This application is a continuation application of International Application No. PCT/CN2017/106094, filed on Oct. 13, 2017, which claims priority to Chinese Patent Application 201710060298.9, filed on Jan. 24, 2017. The disclosures of the aforementioned applications are hereby incorporated by reference in their entireties.

TECHNICAL FIELD

This application relates to the field of communications technologies, and in particular, to a positioning method and a device.

BACKGROUND

Automated driving means that a vehicle can drive safely at any time in any scenarios. The any scenarios include various special driving environments, such as a tunnel, a mountain, a bridge, and an overpass. A positioning technology is most critical in technologies for implementing automated driving, and a high-precision positioning technology is a basis for ensuring safe driving of the vehicle.

At present, an in-vehicle terminal in a vehicle determines a location of the vehicle by receiving a global positioning system (GPS) signal. However, when the in-vehicle terminal in the vehicle cannot receive the GPS signal in some special scenarios such as a tunnel and a mountain, the following technical solution is used for positioning in other approaches. Further, a high-precision map with topographic features is prestored in the in-vehicle terminal. In addition to necessary road information, the high-precision map further provides three-dimension (3D) images and high-precision location information of fixed objects such as a building and a landmark object around a road. The in-vehicle terminal scans a surrounding environment using a 64-line laser radar, to obtain a 3D image. The in-vehicle terminal compares the scanned 3D image with the prestored high-precision map to determine location information of the vehicle.

However, in this positioning manner, the high-precision map with topographical features that is prestored in the in-vehicle terminal is difficult to produce, and has relatively poor maintainability. If the high-precision map is not updated in a timely manner, positioning accuracy is seriously affected, resulting in a traffic accident. To sum up, when the GPS signal cannot be received, the existing positioning manner has relatively poor practicality.

SUMMARY

Embodiments of this application provide a positioning method and a device, to improve operability of positioning when there is no GPS signal.

According to a first aspect, a positioning method is provided, including detecting, by a first device using a sensor, a target object that occurs within a range detectable to the sensor; and performing, by the first device, the following operations when the sensor detects any target object such as determining relative location information of the first device relative to the target object according to a detection signal that is obtained when the sensor detects the target object, where a second device having a communication function is disposed on each target object; determining absolute location information of the target object according to the relative location information and prestored absolute location information of the first device; and sending, using a wireless network, the absolute location information of the target object to the second device disposed on the target object.

In this embodiment of this application, the first device can determine the absolute location information of the target object according to the prestored absolute location information of the first device and the detection signal that is obtained when the sensor detects the target object, and can send, using the wireless network, the absolute location information that is of the target object and that is determined by the first device to the second device disposed on the target object such that the second device can implement positioning of the target object according to the absolute location information of the target object that is sent by the first device. Therefore, this resolves a prior-art problem that positioning of a target object cannot be implemented when there is no GPS signal. Compared with a solution in other approaches that positioning of a target object is implemented by scanning a surrounding object of the target object and performing comparison with a preset high-precision map, this solution is easy to implement, improves operability of positioning, and increases positioning precision of the target object by increasing precision of the sensor.

On a basis of the first aspect, in a possible implementation, the sensor is a video camera or a camera, the first device obtains, using the sensor, a target object identifier attached to the target object, and sends, using the wireless network, the obtained target object identifier and the absolute location information of the target object to the second device disposed on the target object; or the first device obtains, using the sensor, a target object identifier attached to the target object, and determines, from a preset correspondence list between a target object identifier and a second-device identifier, a second-device identifier corresponds to the target object identifier; and the first device sends, according to the determined second-device identifier using the wireless network, the absolute location information of the target object to the second device disposed on the target object.

The target object identifier corresponds to an absolute location of the target object. Therefore, this reduces a probability that when multiple pieces of absolute location information are determined by the first device, the absolute location information sent to the second device by the first device mismatches the target object disposed with the second device.

On the basis of the first aspect, a possible implementation of sending, by the first device using the wireless network, the target object identifier and the absolute location information of the target object to the second device disposed on the target object is broadcasting, by the first device, a data packet using the wireless network, where the data packet includes a correspondence between a target object identifier of each target object detected by the first device using the sensor and absolute location information of each target object; or broadcasting, by the first device, a data packet using the wireless network, where the data packet includes a correspondence between a second-device identifier of each target object detected by the first device using the sensor and absolute location information of each target object.

On the basis of the first aspect, in a possible implementation, the sensor is installed on the first device, or the sensor is connected to the first device in a wireless or wired manner.

On the basis of the first aspect, in a possible implementation, the target object is a vehicle, and the target object identifier is a vehicle license plate number.

According to a second aspect, a positioning method is provided, including receiving, by a second device disposed on a first target object and having a communication function, using a wireless network, absolute location information of the first target object that is sent by at least one first device, where the absolute location information of the first target object that is sent by the at least one first device is determined by the at least one first device according to a detection signal that is obtained when a sensor detects the first target object; and determining, by the second device, positioning information of the first target object according to the absolute location information of the first target object that is sent by the at least one first device.

The second device can implement positioning of a target object according to absolute location information that is of the target object and that is sent by the first device. Therefore, this resolves a prior-art problem that positioning of a target object cannot be implemented when there is no GPS signal. Compared with a solution in other approaches that positioning of a target object is implemented by scanning a surrounding object of the target object and performing comparison with a preset high-precision map, this solution is easy to implement, improves operability of positioning, and increases positioning precision of the target object by increasing precision of the sensor.

On a basis of the second aspect, in a possible implementation, the sensor is a video camera or a camera; and the second device receives at least one data packet using the wireless network, where each data packet is broadcast by one first device, and each data packet includes a correspondence between a target object identifier of each target object detected by the first device using the sensor and absolute location information of each target object, and determines the absolute location information of the first target object as absolute location information that corresponds to a target object identifier of the first target object and that is in the at least one data packet; or the second device receives the at least one data packet using the wireless network, where each data packet is broadcast by one first device, and each data packet includes a correspondence between an identifier of a communications device on each target object detected by the first device using the sensor and absolute location information of each target object, and determines the absolute location information of the first target object as absolute location information that corresponds to an identifier of the second device and that is in the at least one data packet.

The second device can find, based on the target object identifier or a second-device identifier and from all correspondences included in the data packet, the absolute location information of the target object disposed with the second device. Therefore, this improves accuracy of positioning.

On the basis of the second aspect, in a possible implementation, the sensor is installed on the first device, or the sensor is connected to the first device in a wireless or wired manner.

On the basis of the second aspect, in a possible implementation, the first target object is a vehicle, and an identifier of the first target object is a vehicle license plate number.

On the basis of the second aspect, in a possible implementation, the second device determines the positioning information of the first target object as one piece of absolute location information in the absolute location information of the first target object that is sent by the at least one first device.

The second device determines the positioning information of the first target object as an average value of at least one piece of absolute location information of the first target object that is sent by the at least one first device.

According to a third aspect, a positioning method is provided, including detecting, by a communications device disposed on a moving target object, using a sensor installed on the moving target object, during motion of the moving target object, an identifier of at least one fixed object occurring in a moving environment, and determining relative location information of the moving target object relative to the at least one fixed object using the sensor; determining, from a preset correspondence between a fixed-object identifier and absolute location information according to the identifier of the at least one fixed object, absolute location information corresponds to the identifier of the at least one fixed object; and estimating positioning information of the moving target object according to the absolute location information of the at least one fixed object and the relative location information of the moving target object relative to the at least one fixed object.

According to a fourth aspect, a positioning method is provided, including, for each of at least one first device, receiving, by a second device disposed on a first target object and having a communication function, absolute location information of at least one target object using a wireless network, where the absolute location information of the at least one target object is determined by the first device according to a detection signal that is obtained when a sensor detects the at least one target object; determining at least one piece of first relative location information, where each of the at least one piece of first relative location information is relative location information between two pieces of absolute location information in the absolute location information of the at least one target object; determining at least one piece of second relative location information according to the detection signal that is obtained when the sensor detects the at least one target object, where each of the at least one piece of second relative location information is relative location information of the first target object relative to one of the at least one target object; determining absolute location information of the first target object from the absolute location information of the at least one target object by performing matching between the at least one piece of first relative location information and the at least one piece of second relative location information; and determining positioning information of the first target object according to the determined absolute location information of the first target object.

According to a fifth aspect, a first device is provided, including a processing unit and a transceiver unit, where the processing unit is configured to control a sensor to detect a target object that occurs within a range detectable to the sensor, and perform the following operations when the sensor detects any target object, determining relative location information of the first device relative to the target object according to a detection signal that is obtained when the sensor detects the target object, and determining absolute location information of the target object according to the relative location information and prestored absolute location information of the first device, where a second device having a communication function is disposed on each target object; and the transceiver unit is configured to send, using a wireless network, the absolute location information of the target object to the second device disposed on the target object.

On a basis of the fifth aspect, in a possible implementation, the sensor is a video camera or a camera, where the processing unit is further configured to control the sensor to obtain a target object identifier attached to the target object, and the transceiver unit is further configured to send, using the wireless network, the obtained target object identifier and the absolute location information of the target object to the second device disposed on the target object; or the processing unit is further configured to control the sensor to obtain a target object identifier attached to the target object, and determine, from a preset correspondence list between a target object identifier and a second-device identifier, a second-device identifier corresponds to the target object identifier, and the transceiver unit is further configured to send, according to the determined second-device identifier using the wireless network, the absolute location information of the target object to the second device disposed on the target object.

On the basis of the fifth aspect, in a possible implementation, the transceiver unit is further configured to broadcast a data packet using the wireless network, where the data packet includes a correspondence between a target object identifier of each target object detected by the first device using the sensor and absolute location information of each target object; or broadcast a data packet using the wireless network, where the data packet includes a correspondence between a second-device identifier of each target object detected by the first device using the sensor and absolute location information of each target object.

On the basis of the fifth aspect, in a possible implementation, the sensor is installed on the first device, or the sensor is connected to the first device in a wireless or wired manner.

On the basis of the fifth aspect, in a possible implementation, the target object is a vehicle, and the target object identifier is a vehicle license plate number.

According to a sixth aspect, a second device is provided, including a transceiver unit and a processing unit, where the second device is disposed on a first target object; the transceiver unit is configured to receive, using a wireless network, absolute location information of the first target object that is sent by at least one first device, where the absolute location information of the first target object that is sent by the at least one first device is determined by the at least one first device according to a detection signal that is obtained when a sensor detects the first target object; and the processing unit is configured to determine positioning information of the first target object according to the absolute location information of the first target object that is sent by the at least one first device.

On a basis of the sixth aspect, in a possible implementation, the sensor is a video camera or a camera, where the transceiver unit is further configured to receive at least one data packet using the wireless network, where each data packet is broadcast by one first device, and each data packet includes a correspondence between a target object identifier of each target object detected by the first device using the sensor and absolute location information of each target object; and the processing unit is specifically configured to determine the absolute location information of the first target object as absolute location information that corresponds to a target object identifier of the first target object and that is in the at least one data packet.

On the basis of the sixth aspect, in a possible implementation, the sensor is a video camera or a camera, where the transceiver unit is further configured to receive at least one data packet using the wireless network, where each data packet is broadcast by one first device, and each data packet includes a correspondence between an identifier of a communications device on each target object detected by the first device using the sensor and absolute location information of each target object; and the processing unit is further configured to determine the absolute location information of the first target object as absolute location information that corresponds to an identifier of a communications device the same as an identifier of the second device and that is in the at least one data packet.

On the basis of the sixth aspect, in a possible implementation, the sensor is installed on the first device, or the sensor is connected to the first device in a wireless or wired manner.

On the basis of the sixth aspect, in a possible implementation, the first target object is a vehicle, and an identifier of the first target object is a vehicle license plate number.

On the basis of the sixth aspect, in a possible implementation, the processing unit is further configured to determine the positioning information of the first target object as one piece of absolute location information in the absolute location information of the first target object that is sent by the at least one first device; or determine the positioning information of the first target object as an average value of the absolute location information of the first target object that is sent by the at least one first device.

According to a seventh aspect, a communications device is provided, including a processing unit and a transceiver unit, where the communications device is disposed on a moving target object; the transceiver unit is configured to receive an identifier that is of at least one fixed object occurring in a moving environment and that is detected and sent when a sensor disposed on the moving target object detects the at least one fixed object occurring in the moving environment, and relative location information of the moving target object relative to the at least one fixed object; and the processing unit is configured to determine, from a preset correspondence between a fixed-object identifier and absolute location information according to the identifier of the at least one fixed object, absolute location information corresponds to the identifier of the at least one fixed object, and estimate positioning information of the moving target object according to the absolute location information of the at least one fixed object and the relative location information of the moving target object relative to the at least one fixed object.

According to an eighth aspect, a second device is provided, including a transceiver unit and a processing unit, where the second device is disposed on a first target object and has a communication function; the transceiver unit is configured to, for each of at least one first device, receive absolute location information of at least one target object, where the absolute location information of the at least one target object is determined by the first device according to a detection signal that is obtained when a sensor detects the at least one target object; and the processing unit is configured to determine at least one piece of first relative location information, where each of the at least one piece of first relative location information is relative location information between two pieces of absolute location information in the absolute location information of the at least one target object; determine at least one piece of second relative location information according to the detection signal that is obtained when the sensor detects the at least one target object, where each of the at least one piece of second relative location information is relative location information of the first target object relative to one of the at least one target object; determine absolute location information of the first target object from the absolute location information of the at least one target object by performing matching between the at least one piece of first relative location information and the at least one piece of second relative location information;

and determine positioning information of the first target object according to the determined absolute location information of the first target object.

BRIEF DESCRIPTION OF DRAWINGS

FIG. 2 is a schematic diagram of an application scenario according to an embodiment of this application;

FIG. 3 is a schematic flowchart of a positioning method according to an embodiment of this application;

DESCRIPTION OF EMBODIMENTS

The embodiments of this application may be applied to scenarios such as vehicle positioning, pedestrian positioning, and obstacle positioning in a transportation system, and may also be applied to a scenario in which a robot locates an indoor or outdoor target object, and the like.

Vehicle positioning applied to the transportation system is used as an example to describe the embodiments of this application in detail. A positioning manner applied to another application scenario is similar to a vehicle positioning manner applied to the scenario of the transportation system. Details are not described herein again.

In the embodiments of this application, a first device can determine absolute location information of a target object according to prestored absolute location information of the first device and a detection signal that is obtained when a sensor detects the target object, and can send, using a wireless network, the absolute location information that is of the target object and that is determined by the first device to a second device disposed on the target object such that the second device can implement positioning of the target object according to the absolute location information that is of the target object and that is sent by the first device. Therefore, this resolves a prior-art problem that positioning of a target object cannot be implemented when there is no GPS signal. Compared with a solution in other approaches that positioning of a target object is implemented by scanning a surrounding object of the target object and performing comparison with a preset high-precision map, this solution is easy to implement, improves operability of positioning, and increases positioning precision of the target object by increasing precision of the sensor.

Figure 1:
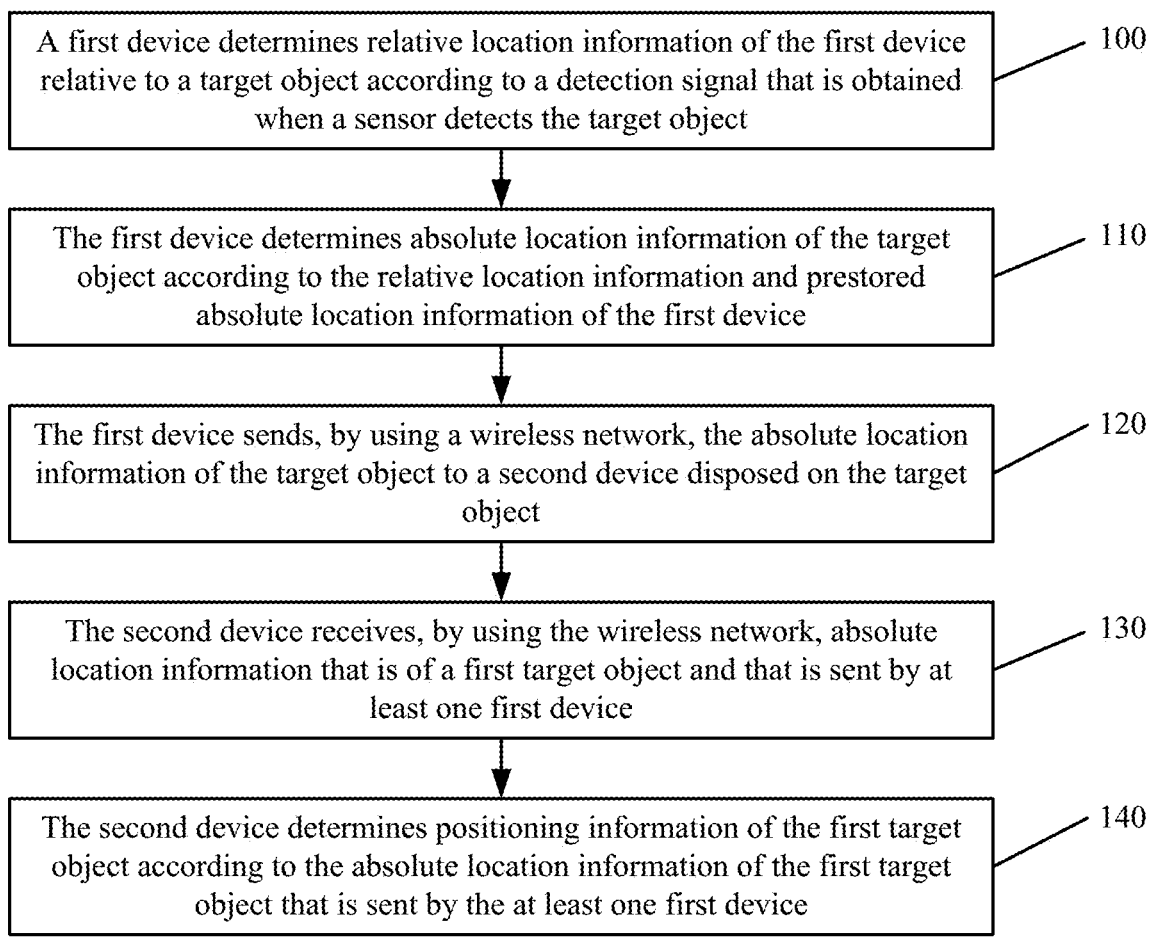
FIG. 1 is a schematic flowchart of a positioning method according to an embodiment of this application.

As shown in FIG. 1, a positioning method in an embodiment of this application includes the following steps.

A first device detects, using a sensor, a target object that occurs within a range detectable to the sensor.

The first device performs step 100 to step 130 when the sensor detects any target object.

Step 100. The first device determines relative location information of the first device relative to the target object according to a detection signal that is obtained when the sensor detects the target object, where a second device having a communication function is disposed on each target object.

Step 110. The first device determines absolute location information of the target object according to the relative location information and prestored absolute location information of the first device.

Step 120. The first device sends, using a wireless network, the absolute location information of the target object to the second device disposed on the target object.

Step 130. The second device receives, using the wireless network, absolute location information that is of a first target object and that is sent by at least one first device, where the target object in which the second device is located is the first target object, and the absolute location information of the first target object is one piece of absolute information that is of a target location and that is determined by the at least one first device.

Step 140. The second device determines positioning information of the first target object according to the absolute location information of the first target object that is sent by the at least one first device.

It should be understood that, in this embodiment of this application, the wireless network may be a mobile data network provided by an operator, for example, a network of a network standard such as Long Term Evolution (Long Term Evolution, LTE), or a wireless local area network (Wireless Local Area Networks, WLAN).

It should be understood that in this embodiment of this application, each first device may be bound to one sensor, or may be bound to a plurality of sensors. The sensor in this embodiment of this application may be a video camera or a camera, or may be a sensing device such as a laser radar or a millimeter wave radar. Further, the sensor may be disposed on the first device, or may send a detection signal to the first device in a wireless or wired manner. The first device is a device having a communication function.

The following uses FIG. 2 as an example for detailed description. As shown in FIG. 2, a sensor T1, a sensor T2, and a sensor T3 are video cameras. Each of the sensor T1, the sensor T2, and the sensor T3 is fastened on a fixed object. The fixed object may be a utility pole, a building, or the like. A vehicle C1, a vehicle C2, a vehicle C3, and a vehicle C4 are target objects, and a second device having a communication function is disposed on each of the vehicle C1, the vehicle C2, the vehicle C3, and the vehicle C4. The second device may be a smart terminal device, for example, an in-vehicle station, a smart phone, a notebook computer, a palmtop computer, or a tablet computer.

The T1 is used as an example. The T1 is disposed on a first device 1. Because a range detectable to the T1 is limited, if the T1 can detect only the C1, C2, and C3 within the detectable range, the T1 sends image information of photographed C1, C2, and C3 to the first device 1 after photographing the C1, C2, and C3. In this case, a detection signal is the image information of the T1-photographed C1, C2, and C3.

The first device 1 determines relative location information of the first device 1 relative to the C1, relative location information of the first device 1 relative to the C2, and relative location information of the first device 1 relative to the C3 according to the image information of the T1-photographed C1, C2, and C3, respectively. Absolute location information of the first device 1 is measured in advance and stored in the first device 1. For example, the absolute location information of the first device 1 is (x1, y1, z1), where x1 is used to indicate a longitude of the first device 1, y1 is used to indicate a latitude of the first device 1, and z1 is used to indicate a height of the first device 1. The first device 1 may determine absolute location information of the C1 using the relative location information relative to the C1 and the absolute location information of the first device 1, determine absolute location information of the C2 using the relative location information relative to the C2 and the absolute location information of the first device 1, and determine absolute location information of the C3 using the relative location information relative to the C3 and the absolute location information of the first device 1. Then, the first device 1 sends the absolute location information of the C1 to a second device 1 disposed on the C1, sends the absolute location information of the C2 to a second device 2 disposed on the C2, and sends the absolute location information of the C3 to a second device 3 disposed on the C3.

If the T2 is disposed on a first device 2 and the T3 is disposed on a first device 3, the T2 can detect the C1, C2, C3, and C4 within a detectable range, and the T3 can detect the C2, C3, and C4 within a detectable range, a manner of determining absolute location information of the C1, C2, C3, and C4 by the first device 2 and a manner of determining absolute location information of the C2, C3, and C4 by the first device 3 are similar to a manner of determining the absolute location information of the C1, C2, and C3 by the first device 1. Details are not described herein again.

Further, a manner of sending the absolute location information of the C1 to the second device 1 disposed on the C1 by the first device 2, a manner of sending the absolute location information of the C2 to the second device 2 disposed on the C2 by the first device 2, a manner of sending the absolute location information of the C3 to the second device 3 disposed on the C3 by the first device 2, a manner of sending the absolute location information of the C4 to the second device 4 disposed on the C4 by the first device 2, a manner of sending the absolute location information of the C2 to the second device 2 disposed on the C2 by the first device 3, a manner of sending the absolute location information of the C3 to the second device 3 disposed on the C3 by the first device 3, and a manner of sending the absolute location information of the C4 to the second device 4 disposed on the C4 by the first device 3, a manner of sending the absolute location information of the C2 to the second device 2 disposed on the C2 by the first device 1, and a manner of sending the absolute location information of the C3 to the second device 3 disposed on the C3 by the first device 1 are similar to a manner of sending the absolute location information of the C1 to the second device 1 disposed on the C1 by the first device 1. Therefore, the following uses the manner of sending the absolute location information of the C1 to the second device 1 disposed on the C1 by the first device 1 as an example for detailed description.

The first device 1 obtains, using the T1, a target object identifier attached to the C1. Further, an optional implementation is that the first device 1 obtains, from the image information of the T1-detected C1, C2 and C3, the target object identifier attached to the C1, and sends, using the wireless network, the target object identifier and the absolute location information of the C1 to the second device 1 disposed on the C1. When the C1 is a vehicle, the target object identifier may be a vehicle license plate number. After receiving the target object identifier and the absolute location information of the C1, the second device 1 determines, using the target object identifier, that received absolute location information is the absolute location information of the C1.

A possible implementation in which the first device 1 sends, using the target object identifier, the absolute location information of the C1 to the second device 1 is that the first device 1 may send a correspondence between the target object identifier and the absolute location information of the C1 to an intelligent transportation system; then, the intelligent transportation system finds an identifier of the second device 1 from a prestored correspondence between a target object identifier and a second-device identifier according to the target object identifier, and sends the absolute location information of the C1 to the second device 1 according to the identifier of the second device 1. For example, when the second device 1 is a smart phone, an identifier may be a network identifier that can be used to indicate identifier information of the second device 1, for example, a mobile phone number or a user equipment identifier (User Equipment Identification, UE_ID). The identifier may alternatively be a network address, for example, a Media Access Control address (Media Access Control Address, MAC Address) or an Internet Protocol address (Internet Protocol Address, IP Address). In this sending manner, the second device 1 can directly receive the absolute location information of the C1, without receiving absolute location information of another target object different from the absolute location information of the C1. Another possible implementation in which the first device 1 sends, using the target object identifier, the absolute location information of the C1 to the second device 1 is that the first device 1 broadcasts a data packet using the wireless network, and the data packet includes a correspondence between the target object identifier of the C1 and the absolute location information of the C1. In a specific implementation, the first device 1 can separately determine the absolute location information of the C1, C2, and C3. Therefore, the first device 1 may encapsulate the correspondence between the target object identifier of the C1 and the absolute location information of the C1, a correspondence between a target object identifier of the C2 and the absolute location information of the C2, and a correspondence between a target object identifier of the C3 and the absolute location information of the C3 into one data packet for broadcasting, or may encapsulate the correspondence between the target object identifier of the C1 and the absolute location information of the C1, a correspondence between a target object identifier of the C2 and the absolute location information of the C2, and a correspondence between a target object identifier of the C3 and the absolute location information of the C3 separately into three data packets for broadcasting. After receiving the data packet, the second device 1 determines, from the correspondences included in the data packet, the absolute location information of the C1 corresponds to the target object identifier of the C1.

A third possible implementation in which the first device 1 sends, using the target object identifier, the absolute location information of the C1 to the second device 1 is as follows. A correspondence between a target object identifier and a second-device identifier is prestored in the first device 1. The first device 1 determines an identifier of the second device 1 from the prestored correspondence between the target object identifier and the second-device identifier according to the target object identifier of the C1; then, the first device 1 sends the absolute location information of the C1 to the second device 1. In this way, the absolute location information of the C1 can be directly sent to the second device 1 without using the intelligent transportation system. A fourth possible implementation in which the first device 1 sends, using the target object identifier, the absolute location information of the C1 to the second device 1 is as follows. A correspondence between a target object identifier and a second-device identifier is prestored in the first device 1. The first device 1 determines an identifier of the second device 1 from the prestored correspondence between the target object identifier and the second-device identifier according to the target object identifier of the C1, and then broadcasts a data packet, where the data packet includes the correspondence between the identifier of the second device 1 and the absolute location information of the C1. The first device 1 can separately determine the absolute location information of the C1, C2, and C3. Therefore, the first device 1 may encapsulate the correspondence between the target object identifier of the C1 and the absolute location information of the C1, a correspondence between a target object identifier of the C2 and the absolute location information of the C2, and a correspondence between a target object identifier of the C3 and the absolute location information of the C3 into one data packet for broadcasting, or may encapsulate the correspondence between the target object identifier of the C1 and the absolute location information of the C1, a correspondence between a target object identifier of the C2 and the absolute location information of the C2, and a correspondence between a target object identifier of the C3 and the absolute location information of the C3 separately into three data packets for broadcasting. After receiving the data packet, the second device 1 determines, from the correspondences included in the data packet, the absolute location information of the C1 corresponds to the target object identifier of the C1.

In addition, appearance image information of a driver may also be photographed when the sensor is a video camera or a camera. An identification number of the driver may be obtained using the appearance image information of the driver such that the identifier of the second device is obtained based on the identification number of the driver.

It should be noted that, in this embodiment of this application, when the target object is a vehicle, in addition to the vehicle license plate number, the target object identifier may alternatively be external characteristic information of the vehicle, such as a brand, a color, and an aging degree of the vehicle.

When the sensor is a laser radar or another sensor incapable of obtaining image information, the first device may determine the identifier of the second device in the following manner.

The first device determines the identifier of the second device in the wireless network using a radio signal sent by the second device. Further, the radio signal may be a cell handover signal, a reference signal, or the like. When the target object is located in a cell handover area, the second device sends a cell handover signal to a network device. The first device obtains the cell handover signal, and extracts the identifier of the second device from the handover signal. Alternatively, the first device obtains a reference signal of the second device, and extracts the identifier of the second device from the reference signal.

In addition, when the sensor is a laser radar or another sensor incapable of obtaining image information, the sensor may send laser or another signal to the target object and then measure a signal that is returned after the signal sent by the sensor reaches the target object, to determine the relative location information of the first device relative to the target object. In this case, the sensor is usually disposed on the first device. In this embodiment of this application, a quantity of sensors disposed on the first device is not limited.

Using FIG. 2 as an example, both the first device 1 and the first device 2 can determine the absolute location information of the C1, and the second device 1 can receive at least the absolute location information of the C1 sent by the first device 1 and the absolute location information of the C1 sent by the first device 2.

Further, the second device 1 may randomly select, as positioning information of the C1, one piece of absolute location information in the absolute location information of the C1 sent by the first device 1 and the first device 2. To make the positioning information more accurate, the second device 1 may determine the positioning information of the C1 as an average value of the absolute location information of the C1 sent by the first device 1 and the first device 2. In addition, another location calculation algorithm in other approaches is also applicable to this application, and this is not limited herein.

In addition, the first device may also upload the determined absolute location information of the target object to the intelligent transportation system, or the second device uploads the positioning information of the target object to the intelligent transportation system such that the intelligent transportation system records the absolute location information of the target object, to help a staff know a traffic condition in a timely manner.

As shown in FIG. 3, a positioning method in an embodiment of this application includes the following steps.

Step 300. During motion of a moving target object, a communications device disposed on the moving target object detects, using a sensor installed on the moving target object, an identifier of at least one fixed object occurring in a moving environment, and determines relative location information of the moving target object relative to the at least one fixed object using the sensor.

Step 301. The communications device determines, from a preset correspondence between a fixed-object identifier and absolute location information according to the identifier of the at least one fixed object, absolute location information corresponds to the identifier of the at least one fixed object.

Step 302. The communications device estimates positioning information of the moving target object according to the absolute location information of the at least one fixed object and the relative location information of the moving target object relative to the at least one fixed object.

It should be understood that, in this embodiment of this application, the communications device may be such communications devices as a smart phone, an in-vehicle station, a notebook computer, and a tablet computer, and the fixed object may be a fixedly-located object such as a building or a tree. An identifier of the fixed object is preallocated to the fixed object, and the identifier of the fixed object may be a building name, a numeral identifier allocated to a tree, or the like. The identifier of the fixed object is in a one-to-one correspondence with absolute location information of the fixed object, and the absolute location information of the fixed object is measured in advance. In this embodiment of this application, the sensor is a sensor that can identify the identifier of the fixed object and that can determine, based on a detection signal for the fixed object detected by the sensor, relative location information of a target object relative to the fixed object, for example, a video camera or a camera.

The sensor may further include a first sensing module and a second sensing module. The first sensing module is configured to obtain the identifier of the fixed object, and the second sensing module is configured to obtain the detection signal.

In this embodiment of this application, the target object may be a vehicle, a pedestrian, or the like.

The preset correspondence between the fixed-object identifier and the absolute location information may be prestored in a mobile device, or may be prestored in an intelligent transportation system.

When the preset correspondence between the fixed-object identifier and the absolute location information is prestored in the intelligent transportation system, the communications device may send the obtained identifier of the fixed object to the intelligent transportation system, and then the intelligent transportation system sends, to the communications device, determined absolute location information corresponds to the identifier of the fixed object.

It should be understood that, in step 302, the communications device estimates the positioning information of the moving target object according to the absolute location information of the at least one fixed object and the relative location information of the moving target object relative to the at least one fixed object. Further, the communications device first determines absolute location information of at least one moving target object according to absolute location information of each fixed object and relative location information of the moving target object relative to the fixed object, and then estimates the positioning information of the moving target object according to the absolute location information of the at least one target object. Further, a manner of estimating the positioning information of the moving target object according to the absolute location information of the at least one target object is similar to a manner in which the second device determines the positioning information of the second device according to the absolute location information of the first target object that is sent by the at least one first device in FIG. 1. Details are not described herein again.

It should be noted that, in this embodiment of this application, a communications device may further be installed on each fixed object, and these location-known communications devices broadcast, using a wireless network, correspondences between identifiers and absolute location information of all fixed objects. The communications device in this embodiment of this application obtains the correspondences between the identifiers and the absolute location information of the fixed objects using a signal in the wireless network. In addition, when the target object is a vehicle or another land transportation tool, after the communications device determines the positioning information of the target object, the positioning information of the target object may further be uploaded to the intelligent transportation system such that a traffic condition on a road can be known in a timely manner.

Figure 4:
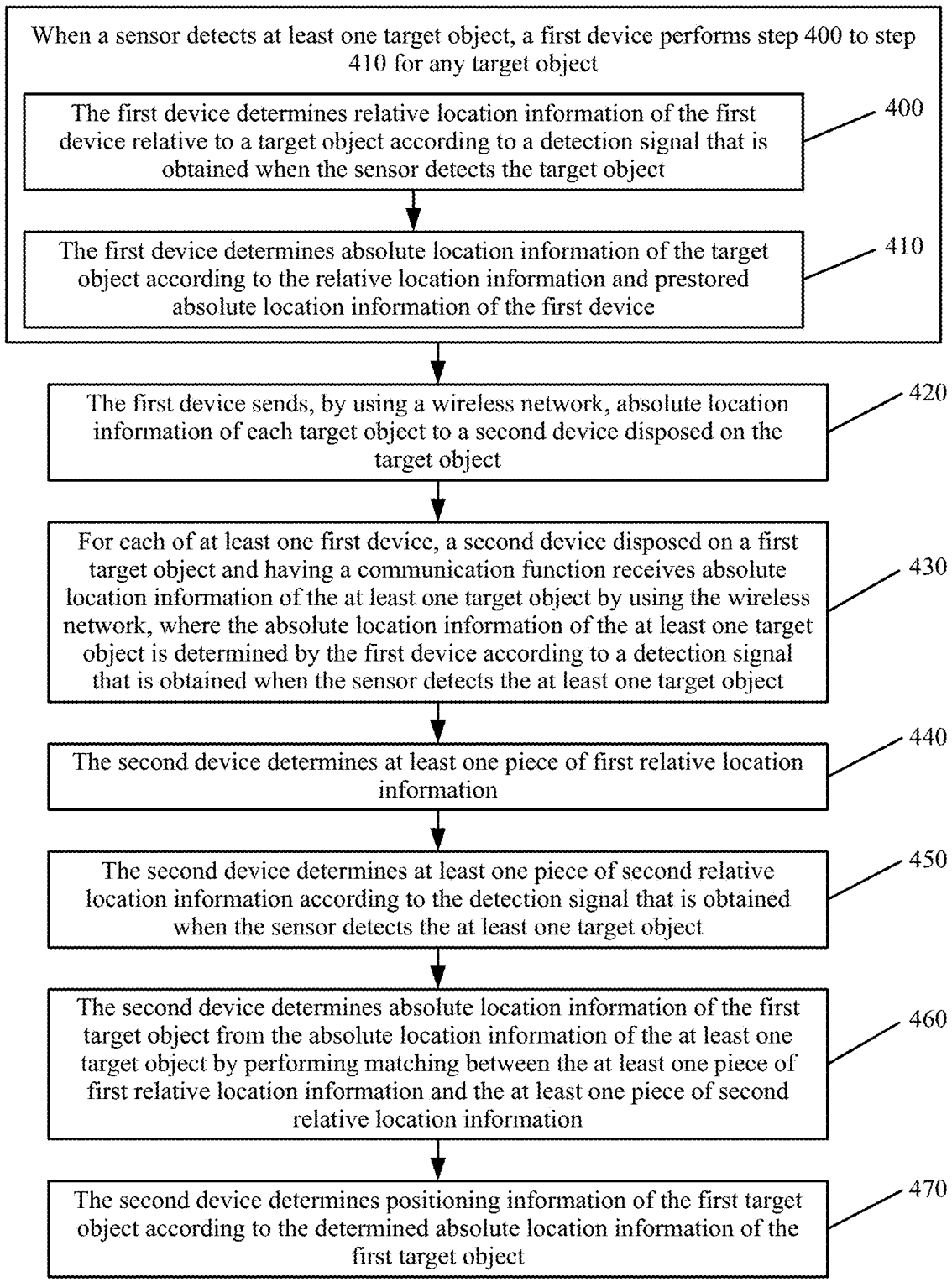
FIG. 4 is a schematic flowchart of a positioning method according to an embodiment of this application.

As shown in FIG. 4, a positioning method in an embodiment of this application includes the following steps.

A first device detects, using a sensor, a target object that occurs within a range detectable to the sensor.

When the sensor detects at least one target object, the first device performs step 400 to step 410 for any one of the at least one target object.

Step 400. The first device determines relative location information of the first device relative to the target object according to a detection signal that is obtained when the sensor detects the target object, where a second device having a communication function is disposed on each target object.

Step 410. The first device determines absolute location information of the target object according to the relative location information and prestored absolute location information of the first device.

Step 420. The first device sends, using a wireless network, absolute location information of each target object to a second device disposed on the target object.

Step 430. For each of at least one first device, a second device disposed on a first target object and having a communication function receives absolute location information of the at least one target object using the wireless network, where the absolute location information of the at least one target object is determined by the first device according to a detection signal that is obtained when the sensor detects the at least one target object.

Step 440. The second device determines at least one piece of first relative location information, where each of the at least one piece of first relative location information is relative location information between two pieces of absolute location information in the absolute location information of the at least one target object.

Step 450: The second device determines at least one piece of second relative location information according to the detection signal that is obtained when the sensor detects the at least one target object, and each of the at least one piece of second relative location information is relative location information of the first target object relative to one of the at least one target object.

Step 460. The second device determines absolute location information of the first target object from the absolute location information of the at least one target object by performing matching between the at least one piece of first relative location information and the at least one piece of second relative location information.

Step 470. The second device determines positioning information of the first target object according to the determined absolute location information of the first target object.

In this embodiment of this application, the first device only needs to send the determined at least one piece of absolute location information to the second device through wireless network broadcasting, with no need to obtain an identifier of the second device.

For example, a second device 1 receives absolute location information 1, absolute location information 2, and absolute location information 3 that are sent by a first device 1, and determines first relative location information 1, first relative location information 2, and first relative location information 3, respectively. The first relative location information 1 is a difference between the absolute location information 1 and the absolute location information 2. The first relative location information 2 is a difference between the absolute location information 1 and the absolute location information 3. The first relative location information 3 is a difference between the absolute location information 2 and the absolute location information 3. Assuming that the absolute location information 1 is (x1, y1, z1) and the absolute location information 2 is (x2, y2, z2), the first relative location information 1 is (x1-x2, y1-y2, z1-z2). One piece of absolute location information in the absolute location information 1, the absolute location information 2, and the absolute location information 3 is absolute location information of a target object disposed with the second device 1. Generally, target locations of surrounding objects of the target object disposed with the second device 1 is the other two absolute locations in the absolute location information 1, the absolute location information 2, and the absolute location information 3. The second device 1 determines second relative location information 1 and second relative location information 2 using a detection signal that is obtained when the sensor detects at least one surrounding target object, and then performs matching between the second relative location information 1, the second relative location information 2, the first relative location information 1, the first relative location information 2, and the first relative location information 3. Assuming that the second relative location information 1 is close to the first relative location information 2 and the second relative location information 2 is close to the first relative location information 1, absolute location information of the target object disposed with the second device 1 is the absolute location information 1 in the absolute location information 1, the absolute location information 2, and the absolute location information 3.

A manner in which the second device 1, when receiving absolute location information of another first device, determines the absolute location information of the target object disposed with the second device 1 is similar to a manner in which the second device 1, when receiving the absolute location information of the first device 1, determines the absolute location information of the target object disposed with the second device 1, and details are not described herein again.

In this embodiment of this application, the first relative location information may alternatively be determined by the first device and then sent to the second device.

Figure 5A:
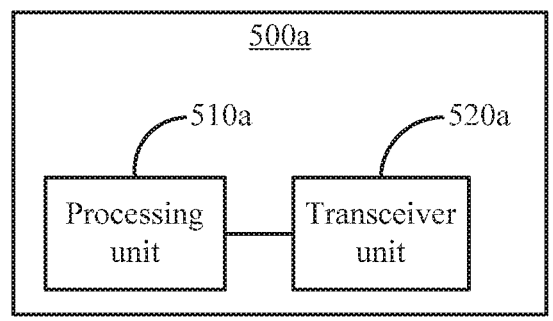
FIG. 5A is a schematic structural diagram of a first device according to an embodiment of this application.
Figure 6A:
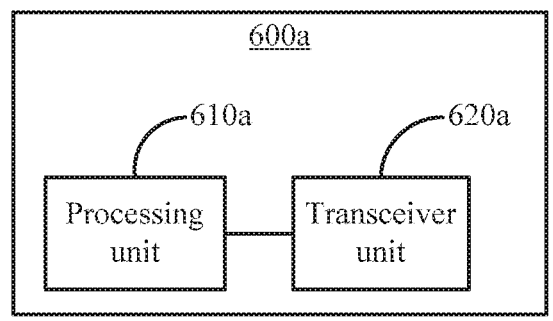
FIG. 6A is a schematic structural diagram of a second device according to an embodiment of this application.

Based on a same concept, the embodiments of this application further provide a first device 500a shown in FIG. 5A and a second device 600a shown in FIG. 6A. A method corresponds to the first device shown in FIG. 5A and the second device shown in FIG. 6A is the positioning method shown in FIG. 1 in the embodiments of this application. Therefore, for implementation of the first device 500a shown in FIG. 5A and the second device 600a shown in FIG. 6A in the embodiments of this application, refer to implementation of the method. Details are not described herein again. As shown in FIG. 5A, the first device 500a in an embodiment of this application includes a processing unit 510a and a transceiver unit 520a.

The processing unit 510a is configured to control a sensor to detect a target object that occurs within a range detectable to the sensor, and perform the following operations when the sensor detects any target object including determining relative location information of the first device relative to the target object according to a detection signal that is obtained when the sensor detects the target object, and determining absolute location information of the target object according to the relative location information and prestored absolute location information of the first device, where a second device having a communication function is disposed on each target object; and the transceiver unit 520a is configured to send, using a wireless network, the absolute location information of the target object to the second device disposed on the target object.

In a possible implementation, the sensor is a video camera or a camera. The processing unit 510a is further configured to control the sensor to obtain a target object identifier attached to the target object, and the transceiver unit 520a is further configured to send, using the wireless network, the obtained target object identifier and the absolute location information of the target object to the second device disposed on the target object; or when the sensor is a video camera or a camera, the processing unit 510a is further configured to control the sensor to obtain a target object identifier attached to the target object, and determine, from a preset correspondence list between a target object identifier and a second-device identifier, a second-device identifier corresponds to the target object identifier, and the transceiver unit 520a is further configured to send, according to the determined second-device identifier using the wireless network, the absolute location information of the target object to the second device disposed on the target object.

In a possible implementation, the transceiver unit 520a is further configured to broadcast a data packet using the wireless network, where the data packet includes a correspondence between a target object identifier of each target object detected by the first device using the sensor and absolute location information of each target object; or broadcast a data packet using the wireless network, where the data packet includes a correspondence between a second-device identifier of each target object detected by the first device using the sensor and absolute location information of each target object.

In a possible implementation, the sensor is installed on the first device 500a, or the sensor is connected to the first device 500a in a wireless or wired manner.

It should be noted that the sensor is connected to the first device 500a. Generally, the sensor sends a signal to the transceiver unit 520a. Then, the processing unit 510a obtains, from the transceiver unit 520a, the signal detected by the sensor. It should be understood that in this embodiment of this application, in a possible implementation, the processing unit 510a may alternatively obtain, directly from the sensor, the signal detected by the sensor.

When the sensor is connected to the first device 500a in a wireless manner, further, a connection to the first device 500a may be established in a wireless manner such as a wireless network, infrared, or Bluetooth.

In a possible implementation, the target object is a vehicle, and the target object identifier is a vehicle license plate number.

Figure 5B:
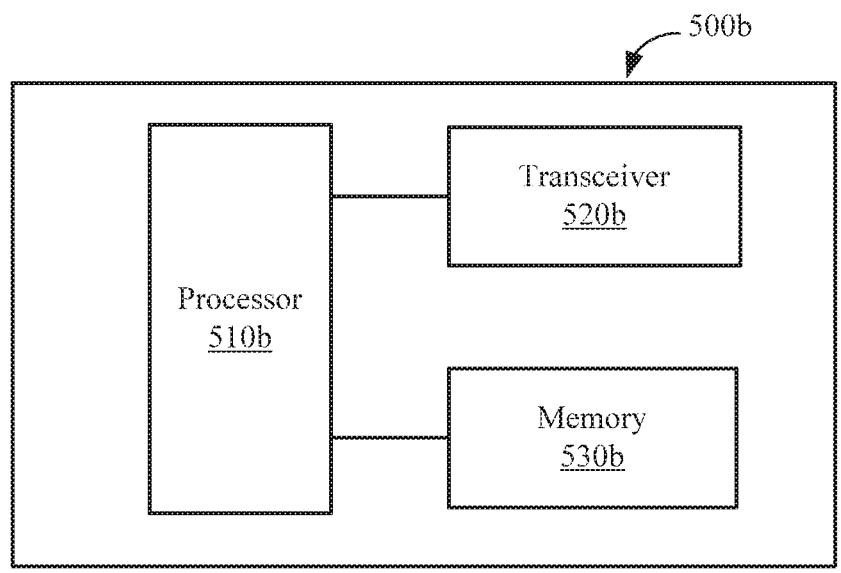
FIG. 5B is a schematic diagram of a hardware structure of a first device according to an embodiment of this application.

It should be noted that the processing unit 510a in this embodiment of this application may be a processor, and the transceiver unit 520a may be a transceiver. As shown in FIG. 5B, a first device 500b may include a processor 510b, a transceiver 520b, and a memory 530b. The memory 530b may be configured to store a program/code preinstalled in the first device 500b before delivery or may store code or the like used for execution of the processor 510b.

The processor 510b may be a general-purpose central processing unit (CPU), a microprocessor, an application-specific integrated circuit (ASIC), or one or more integrated circuits, and is configured to perform a related operation, so as to implement the technical solution provided in this embodiment of this application.

It should be noted that, although only the processor 510b, the transceiver 520b, and the memory 530b are shown for the first device 500b shown in FIG. 5B, in a specific implementation process, a person skilled in the art should understand that the first device 500b further includes another component necessary for normal operation. In addition, according to a specific requirement, a person skilled in the art should understand that the first device 500*b* may further include a hardware component that implements another additional function. In addition, a person skilled in the art should understand that the first device 500*b* may alternatively include only a component or module necessary for implementing this embodiment of this application, but does not need to include all components shown in FIG. 5B.

A person of ordinary skill in the art may understand that all or some of the processes of the methods in the foregoing embodiments may be implemented by a computer program instructing relevant hardware. The program may be stored in a computer-readable storage medium. When the program runs, the processes of the method embodiments may be performed. The storage medium may be a magnetic disk, an optical disc, a read-only memory (ROM), a random access memory (RAM), or the like.

As shown in FIG. 6A, the second device 600*a* in an embodiment of this application includes a transceiver unit 620*a* and a processing unit 610*a*, and the second device 600*a* is disposed on a first target object.

The transceiver unit 620*a* is configured to receive, using a wireless network, absolute location information of the first target object that is sent by at least one first device, where the absolute location information of the first target object that is sent by the at least one first device is determined by the at least one first device according to a detection signal that is obtained when a sensor detects the first target object.

The processing unit 610*a* is configured to determine positioning information of the first target object according to the absolute location information of the first target object that is sent by the at least one first device.

In a possible implementation, the sensor is a video camera or a camera; the transceiver unit 620*a* is further configured to receive at least one data packet using the wireless network, where each data packet is broadcast by one first device, and each data packet includes a correspondence between a target object identifier of each target object detected by the first device using the sensor and absolute location information of each target object; and the processing unit 610*a* is further configured to determine the absolute location information of the first target object as absolute location information that corresponds to a target object identifier of the first target object and that is in the at least one data packet.

In a possible implementation, the sensor is a video camera or a camera; the transceiver unit 620*a* is further configured to receive at least one data packet using the wireless network, where each data packet is broadcast by one first device, and each data packet includes a correspondence between an identifier of a communications device on each target object detected by the first device using the sensor and absolute location information of each target object; and the processing unit 610*a* is further configured to determine the absolute location information of the first target object as absolute location information that corresponds to an identifier of a communications device the same as an identifier of the second device and that is in the at least one data packet.

In a possible implementation, the sensor is installed on the first device, or the sensor is connected to the first device in a wireless or wired manner.

In a possible implementation, the first target object is a vehicle, and an identifier of the first target object is a vehicle license plate number.

In a possible implementation, the processing unit 610*a* is further configured to determine the positioning information of the first target object as one piece of absolute location information in the absolute location information of the first target object that is sent by the at least one first device; or determine the positioning information of the first target object as an average value of the absolute location information of the first target object that is sent by the at least one first device.

Figure 6B:
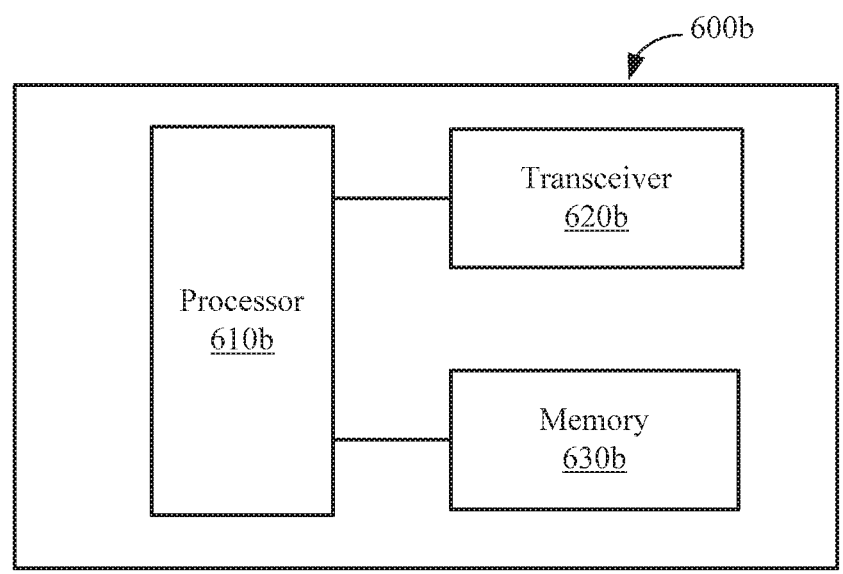
FIG. 6B is a schematic diagram of a hardware structure of a second device according to an embodiment of this application.

It should be noted that the processing unit 610*a* in this embodiment of this application may be a processor, and the transceiver unit 620*a* may be a transceiver. As shown in FIG. 6B, a second device 600*b* may include a processor 610*b*, a transceiver 620*b*, and a memory 630*b*. The memory 630*b* may be configured to store a program/code preinstalled in the second device 600*b* before delivery or may store code or the like used for execution of the processor 610*b*.

The processor 610*b* may be a general-purpose CPU, a microprocessor, an ASIC, or one or more integrated circuits, and is configured to perform a related operation, so as to implement the technical solution provided in this embodiment of this application. It should be noted that, although only the processor 610*b*, the transceiver 620*b*, and the memory 630*b* are shown for the second device 600*b* shown in FIG. 6B, in a specific implementation process, a person skilled in the art should understand that the second device 600*b* further includes another component necessary for normal operation. In addition, according to a specific requirement, a person skilled in the art should understand that the second device 600*b* may further include a hardware component that implements another additional function. In addition, a person skilled in the art should understand that the second device 600*b* may alternatively include only a component or module necessary for implementing this embodiment of this application, but does not need to include all components shown in FIG. 6B.

A person of ordinary skill in the art may understand that all or some of the processes of the methods in the foregoing embodiments may be implemented by a computer program instructing relevant hardware. The program may be stored in a computer-readable storage medium. When the program runs, the processes of the method embodiments may be performed. The storage medium may be a magnetic disk, an optical disc, a ROM, a RAM, or the like.

Figure 7A:
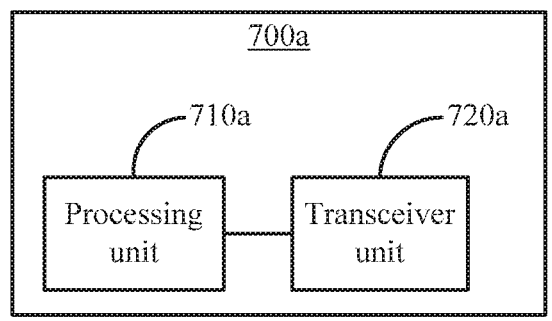
FIG. 7A is a schematic structural diagram of a communications device according to an embodiment of this application.

Based on a same idea, the embodiments of this application further provide a communications device 700*a* shown in FIG. 7A. A method corresponds to the communications device 700*a* shown in FIG. 7A is the positioning method shown in FIG. 3 in the embodiments of this application. Therefore, for implementation of the communications device 700*a* shown in FIG. 7A in the embodiments of this application, refer to implementation of the method. Details are not described herein again.

As shown in FIG. 7A, the communications device 700*a* in an embodiment of this application includes a processing unit 710*a* and a transceiver unit 720*a*, and the communications device 700*a* is disposed on a moving target object.

The transceiver unit 720*a* is configured to receive an identifier that is of at least one fixed object occurring in a moving environment and that is detected and sent when a sensor disposed on the moving target object detects the at least one fixed object occurring in the moving environment, and relative location information of the moving target object relative to the at least one fixed object; and the processing unit 710*a* is configured to determine, from a preset correspondence between a fixed-object identifier and absolute location information according to the identifier of the at least one fixed object, absolute location information corresponds to the identifier of the at least one fixed object, and estimate positioning information of the moving target object according to the absolute location information of the at least one fixed object and the relative location information of the moving target object relative to the at least one fixed object.

Figure 7B:
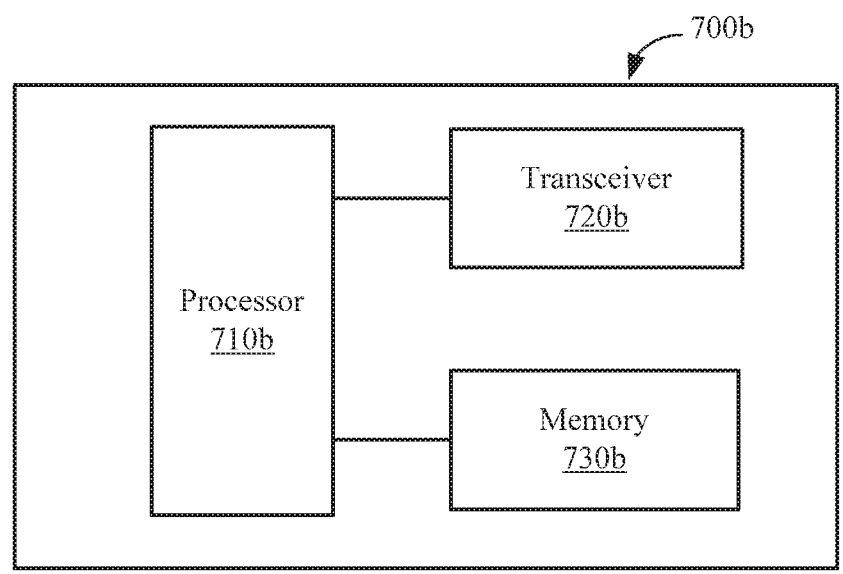
FIG. 7B is a schematic diagram of a hardware structure of a communications device according to an embodiment of this application.

It should be noted that the processing unit 710a in this embodiment of this application may be a processor, and the transceiver unit 720a may be a transceiver. As shown in FIG. 7B, a communications device 700b may include a processor 710b, a transceiver 720b, and a memory 730b. The memory 730b may be configured to store a program/code preinstalled in the communications device 700b before delivery or may store code or the like used for execution of the processor 710b.

The processor 710b may be a general-purpose CPU, a microprocessor, an ASIC, or one or more integrated circuits, and is configured to perform a related operation, so as to implement the technical solution provided in this embodiment of this application.

It should be noted that, although only the processor 710b, the transceiver 720b, and the memory 730b are shown for the communications device 700b shown in FIG. 7B, in a specific implementation process, a person skilled in the art should understand that the communications device 700b further includes another component necessary for normal operation. In addition, according to a specific requirement, a person skilled in the art should understand that the communications device 700b may further include a hardware component that implements another additional function. In addition, a person skilled in the art should understand that the communications device 700b may alternatively include only a component or module necessary for implementing this embodiment of this application, but does not need to include all components shown in FIG. 7B.

A person of ordinary skill in the art may understand that all or some of the processes of the methods in the foregoing embodiments may be implemented by a computer program instructing relevant hardware. The program may be stored in a computer-readable storage medium. When the program runs, the processes of the method embodiments may be performed. The storage medium may be a magnetic disk, an optical disc, a ROM, a RAM, or the like.

Figure 8A:
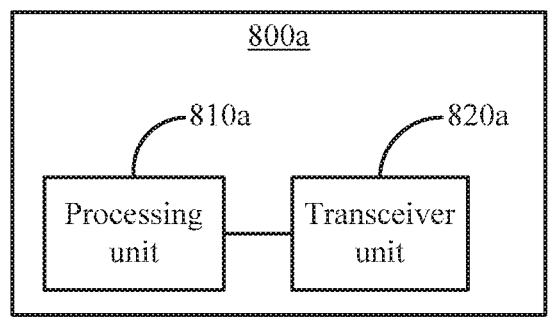
FIG. 8A is a schematic structural diagram of a second device according to an embodiment of this application.

Based on a same concept, the embodiments of this application further provide a second device 800a shown in FIG. 8a. A method corresponds to the second device shown in FIG. 8A is the positioning method shown in FIG. 4 in the embodiments of this application. Therefore, for implementation of the second device 800a shown in FIG. 8A in the embodiments of this application, refer to implementation of the method. Details are not described herein again.

As shown in FIG. 8A, the second device 800a in an embodiment of this application includes a transceiver unit 820a and a processing unit 810a, and the second device 800a is disposed on a first target object and has a communication function.

The transceiver unit 820a is configured to, for each of at least one first device, receive absolute location information of at least one target object, where the absolute location information of the at least one target object is determined by the first device according to a detection signal that is obtained when a sensor detects the at least one target object.

The processing unit 810a is configured to, determine at least one piece of first relative location information, where each of the at least one piece of first relative location information is relative location information between two pieces of absolute location information in the absolute location information of the at least one target object; determine at least one piece of second relative location information according to the detection signal that is obtained when the sensor detects the at least one target object, where each of the at least one piece of second relative location information is relative location information of the first target object relative to one of the at least one target object; determine absolute location information of the first target object from the absolute location information of the at least one target object by performing matching between the at least one piece of first relative location information and the at least one piece of second relative location information; and determine positioning information of the first target object according to the determined absolute location information of the first target object.

Figure 8B:
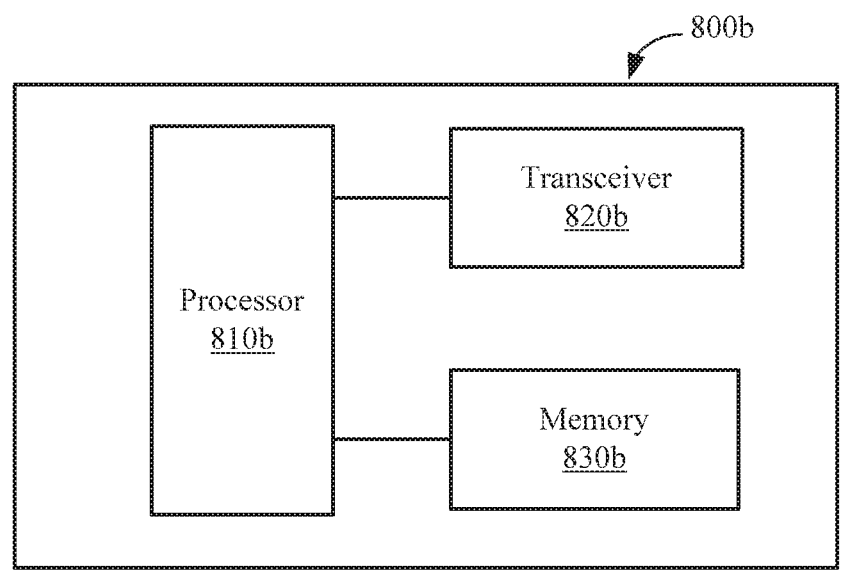
FIG. 8B is a schematic diagram of a hardware structure of a second device according to an embodiment of this application.

It should be noted that the processing unit 810a in this embodiment of this application may be a processor, and the transceiver unit 820a may be a transceiver. As shown in FIG. 8B, a second device 800b may include a processor 810b, a transceiver 820b, and a memory 830b. The memory 830b may be configured to store a program/code preinstalled in the second device 800b before delivery or may store code or the like used for execution of the processor 810b.

The processor 810b may be a general-purpose CPU, a microprocessor, an ASIC, or one or more integrated circuits, and is configured to perform a related operation, so as to implement the technical solution provided in this embodiment of this application.

It should be noted that, although only the processor 810b, the transceiver 820b, and the memory 830b are shown for the second device 800b shown in FIG. 8B, in a specific implementation process, a person skilled in the art should understand that the second device 800b further includes another component necessary for normal operation. In addition, according to a specific requirement, a person skilled in the art should understand that the second device 800b may further include a hardware component that implements another additional function. In addition, a person skilled in the art should understand that the second device 800b may alternatively include only a component or module necessary for implementing this embodiment of this application, but does not need to include all components shown in FIG. 8B.

A person of ordinary skill in the art may understand that all or some of the processes of the methods in the foregoing embodiments may be implemented by a computer program instructing relevant hardware. The program may be stored in a computer-readable storage medium. When the program runs, the processes of the method embodiments may be performed. The storage medium may be a magnetic disk, an optical disc, a ROM, a RAM, or the like.

To sum up, according to the technical solution in the embodiments of this application, the second device can implement positioning of the target object according to the absolute location information of the target object that is sent by the first device. Therefore, this resolves a prior-art problem that positioning of a target object cannot be implemented when there is no GPS signal. Compared with a solution in other approaches that positioning of a target object is implemented by scanning a surrounding object of the target object and performing comparison with a preset high-precision map, this solution is easy to implement, improves operability of positioning, and increases positioning precision of the target object by increasing precision of the sensor.

A person skilled in the art should understand that the embodiments of this application may be provided as a method, a system, or a computer program product. Therefore, the embodiments of this application may be in a form of hardware only embodiments, software only embodiments, or embodiments with a combination of software and hardware. Moreover, the embodiments of this application may use a form of a computer program product that is implemented on one or more computer-usable storage media (including but not limited to a disk memory, a compact disc-read only memory (CD-ROM), an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by the computer or the processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specified function in one or more processes in the flowcharts and/or in one or more blocks in the block diagrams.

These computer program instructions may be installed onto a computer or another programmable data processing device such that a series of operation steps are performed on the computer or the other programmable device, thereby generating computer-implemented processing. In this way, the instructions executed on the computer or the other programmable device provide steps for implementing a specified function in one or more processes in the flowcharts and/or in one or more blocks in the block diagrams.

A person skilled in the art can make various modifications and variations to embodiments of this application without departing from the scope of this application. Therefore, this application is intended to cover these modifications and variations provided that these modifications and variations of the embodiments of this application fall within the scope of the following claims of this application and equivalent technologies thereof.

What is claimed is:

1. A positioning method implemented by a first device, comprising:
   detecting, using a sensor, a fixed object that occurs within a detectable range of the sensor during motion of the first device, wherein the first device comprises the sensor;
   obtaining, using the sensor, a detection signal that corresponds to the fixed object in response to detecting the fixed object;
   determining, using the detection signal, relative location information of the first device in relation to the fixed object;
   determining absolute location information of a target object at the first device according to the relative location information and prestored absolute location information of the fixed object;
   obtaining, using the sensor, a fixed object identifier coupled to the fixed object;
   sending the fixed object identifier and the absolute location information of the fixed object to a second device using a wireless network; and
   determining a position of the target object according to the absolute location information of the target object.

2. The positioning method of claim 1, further comprising broadcasting a data packet using the wireless network, and wherein the data packet comprises a correspondence between a fixed object identifier of the fixed object and the absolute location information of the fixed object.

3. The positioning method of claim 1, wherein the sensor comprises a video camera or a camera, and wherein the positioning method further comprises determining, based on a preset correspondence list between the fixed object identifier and a second-device identifier, the second-device identifier that corresponds to the fixed object identifier.

4. The positioning method of claim 3, further comprising broadcasting a data packet using a wireless network, wherein the data packet comprises a correspondence between the second-device identifier of the fixed object and the absolute location information of the fixed object.

5. The positioning method of claim 1, wherein the target object is a vehicle, and wherein an identifier of the fixed object is a numeral identifier of a tree or a building.

6. The positioning method of claim 1, determining the position of the target object as a piece of the absolute location information of the target object.

7. A positioning method implemented by a second device disposed on a first target object, comprising:
   receiving, by a communication function of the second device, absolute location information of a first fixed object of at least one fixed object from at least one communications device using a wireless network, wherein the absolute location information of the first fixed object is based on a detection signal from a sensor at the first target object during motion of the second device, wherein the second device comprises the sensor; and
   determining positioning information of the first target object according to the absolute location information of the first fixed object.

8. The positioning method of claim 7, wherein the sensor is a video camera or a camera, and wherein the positioning method further comprises:
   receiving at least one data packet using the wireless network, wherein at least one of the data packets is a broadcast received from a first communications device of at least one communications device, and wherein at least one of the data packets comprises a correspondence between a fixed object identifier of each fixed object of at least one of the fixed objects and absolute location information of each of the fixed objects; and
   determining absolute location information of the first target object that corresponds to the fixed object identifier of the first fixed object and that is in at least one of the data packets.

9. The positioning method of claim 8, further comprising determining the absolute location information of the first fixed object that corresponds to a second identifier of a second communications device, wherein the second identifier is the same as an identifier of a communications device and that is in at least one of the data packets.

10. The positioning method of claim 7, wherein the first target object is a vehicle, and wherein an identifier of the first fixed object is a numeral identifier of a tree or a building.

11. The positioning method of claim 7, further comprising determining the positioning information of the first target object as a piece of the absolute location information of the first fixed object.

12. The positioning method of claim 7, wherein the sensor is a video camera or a camera, and wherein the positioning method further comprises:
receiving at least one data packet using the wireless network, wherein at least one of the data packets is a broadcast received from a first communications device of at least one of the communications devices, and wherein at least one of the data packets comprises a correspondence between an identifier of the first fixed object on the first communications device and the absolute location information of the fixed object; and
determining the absolute location information of the first target object that corresponds to an identifier of the first communications device and that is in at least one of the data packets.

13. The positioning method of claim 7, wherein the positioning method further comprises determining positioning information of the first fixed object as an average value of at least a piece of the absolute location information of the first fixed object.

14. A device, comprising:
a transceiver configured to receive, using a wireless network, absolute location information of a first fixed object from at least one detection equipment, wherein the absolute location information of the first fixed object is based on a detection signal from a sensor at a first target object during motion of the device, wherein the first target object comprises the sensor; and
a processor coupled to the transceiver and configured to determine positioning information of the first target object according to the absolute location information of the first fixed object.

15. The device of claim 14, wherein the sensor comprises a video camera or a camera, wherein the transceiver is further configured to receive, using the wireless network, at least one data packet from a communications device, wherein at least one of the data packets is a broadcast from a communication device, wherein at least one of the data packets comprises a correspondence between a fixed object identifier of each fixed object and absolute location information of each of the fixed objects, and wherein the processor is further configured to determine the absolute location information of the first target object that corresponds to a fixed object identifier of the first fixed object and that is in at least one of the data packets.

16. The device of claim 14, wherein the sensor comprises a video camera or a camera, wherein the transceiver is further configured to receive, using the wireless network, at least one data packet, wherein at least one of the data packets is a broadcast received from at least one communication device, and wherein at least one of the data packets comprises a correspondence between an identifier of a communications device on each fixed object and the absolute location information of each of the fixed objects.

17. The device of claim 16, wherein the processor is further configured to determine positioning information of the first fixed object as an average value of the absolute location information of the first fixed object.

18. The device of claim 16, wherein the processor is further configured to determine the absolute location information of the first fixed object to be second absolute location information that corresponds to a second identifier of a second communications device, wherein the second identifier is the same as a first identifier of the communications device and that is in at least one of the data packets.

19. The device of claim 16, wherein the processor is further configured to determine the positioning information of the first target object as a piece of the absolute location information of each of the fixed objects.

20. The device of claim 14, wherein the first target object is a vehicle, and wherein an identifier of the first fixed object is a numeral identifier of a tree or a building.

* * * * *